(12) United States Patent
Siraux et al.

(10) Patent No.: US 7,904,271 B2
(45) Date of Patent: Mar. 8, 2011

(54) METHOD AND SYSTEM FOR DETERMINING CATALYST ACTIVITY

(75) Inventors: Daniel Siraux, Naast (BE); Alain Brusselle, Wilrijk (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 0 days.

(21) Appl. No.: 12/281,572

(22) PCT Filed: Mar. 6, 2007

(86) PCT No.: PCT/EP2007/052096
§ 371 (c)(1),
(2), (4) Date: Aug. 25, 2009

(87) PCT Pub. No.: WO2007/101853
PCT Pub. Date: Sep. 13, 2007

(65) Prior Publication Data
US 2009/0318637 A1    Dec. 24, 2009

(30) Foreign Application Priority Data

Mar. 7, 2006  (EP) .................................... 06110767

(51) Int. Cl.
*G01N 9/00* (2006.01)
*A61L 2/00* (2006.01)
*C08F 2/00* (2006.01)
*G01F 1/00* (2006.01)
*C08F 4/00* (2006.01)

(52) U.S. Cl. ............... 702/137; 702/45; 526/89; 526/90; 526/919; 422/292; 73/32 R

(58) Field of Classification Search ................... 422/110, 422/292; 137/2; 406/10, 19, 31, 32; 526/89, 526/90; 702/45, 137; 73/32 R
See application file for complete search history.

(56) References Cited

U.S. PATENT DOCUMENTS

| 5,098,667 | A | 3/1992 | Young et al. |
| 6,677,265 | B1 * | 1/2004 | Kneale et al. .................. 502/108 |
| 2006/0063266 | A1 | 3/2006 | Walworth |
| 2008/0119622 | A1 | 5/2008 | Miserque et al. |

FOREIGN PATENT DOCUMENTS

EP          1563902 A1    8/2005
WO    WO 2005/077522 A1 *  8/2005

* cited by examiner

*Primary Examiner* — Fred M Teskin
*Assistant Examiner* — Elizabeth Eng
(74) *Attorney, Agent, or Firm* — Tenley R. Krueger

(57) ABSTRACT

The present invention relates to a method for determining activity of a catalyst in a polymerization process, said polymerization process comprising the steps of feeding a catalyst and a diluent into a storage vessel, to form a concentrated settled catalyst, feeding said concentrated settled catalyst into a mixing vessel equipped with mixing means and feeding hydrocarbon diluent into said mixing vessel, to form a diluted catalyst slurry, feeding said diluted catalyst slurry into a polymerization reactor via a volumetric pump, and feeding at least one monomer into said polymerization reactor to form a polymer. The method is characterized in that density of the diluted catalyst slurry is measured between an outlet of the mixing vessel and the volumetric pump, the amount of catalyst fed into the polymerization reactor is determined based on the measured density of the diluted catalyst slurry, and the amount of catalyst fed into the polymerization reactor is compared to the amount of the polymer formed to determine the activity of the catalyst. The invention also relates to a system suitable for carrying out the method.

8 Claims, 1 Drawing Sheet

METHOD AND SYSTEM FOR DETERMINING CATALYST ACTIVITY

FIELD OF THE INVENTION

The present invention relates to a method for determining activity of a catalyst in a polymerisation process, said polymerisation process comprising the steps of feeding a catalyst and a diluent into a storage vessel, to form a concentrated settled catalyst, feeding said concentrated settled catalyst into a mixing vessel equipped with mixing means and feeding hydrocarbon diluent into said mixing vessel, to form a diluted catalyst slurry, feeding said diluted catalyst slurry into a polymerisation reactor via a volumetric pump, and feeding at least one monomer into said polymerisation reactor to form a polymer.

The present invention also relates to a system for determining activity of a catalyst in a polymerisation process comprising at least one storage vessel provided with a catalyst inlet, a diluent inlet and an outlet for a concentrated catalyst slurry, means for transferring said concentrated catalyst slurry from the storage vessel to a mixing vessel, at least one mixing vessel equipped with mixing means, an inlet for the concentrated catalyst slurry, a diluent inlet and an outlet for diluted catalyst slurry, means for transferring the diluted catalyst slurry into a polymerisation reactor, said means being equipped with a volumetric pump, a polymerisation reactor comprising an inlet for the diluted catalyst slurry, an inlet for monomer and an outlet for the polymer, and means for measuring the amount of polymer formed.

BACKGROUND AND OBJECTS OF THE INVENTION

Polyethylene (PE) is synthesized via polymerising ethylene ($CH_2=CH_2$) monomer and optionally a higher 1-olefin comonomer such as 1-butene, 1-hexene, 1-octene or 1-decene. Because PE is cheap, safe, stable to most environments and easy to be processed polyethylene polymers are useful in many applications. According to the synthesis methods, PE can be generally classified into several types such as LDPE (Low Density Polyethylene), LLDPE (Linear Low Density Polyethylene), and HDPE (High Density Polyethylene). Each type of polyethylene has different properties and characteristics.

It is known that the polymerisation of olefins e.g. ethylene, especially by a gas phase polymerisation process, involves the polymerisation of olefin monomer with the aid of catalyst and optionally, if required depending on the used catalyst, a co-catalyst. Suitable catalysts for use in the production of polyolefins, and in particular for the preparation of polyethylene, comprise chromium-type catalysts, Ziegler-Natta catalysts and metallocene catalysts.

According to the present description, the term "catalyst" is defined herein as a substance that causes a change in the rate of a polymerisation reaction without itself being consumed in the reaction. Any catalyst allowing ethylene to be polymerised may be used. By way of examples of such catalysts, mention may be made of catalysts of the Ziegler-Natta type, catalysts based on vanadium or chromium, and metallocene catalysts. According to a preferred embodiment said catalyst is a metallocene.

The term "metallocene catalyst" is used to describe any transition metal complexes consisting of metal atoms "sandwiched" between one or two ligands. In a preferred embodiment, the metallocene catalyst has a general formula MX, wherein M is a transition metal compound selected from group IV and wherein X is a ligand composed of one or two groups of cyclopentadienyl (Cp), indenyl, fluorenyl or their derivatives. Illustrative examples of metallocene catalysts comprise but are not limited to $Cp_2ZrCl_2$, $Cp_2TiCl_2$ or $Cp_2HfCl_2$.

The metallocene catalysts generally are provided on a solid support. The support should be an inert solid, which is chemically unreactive with any of the components of the conventional metallocene catalyst. The support is preferably a silica compound.

The use of metallocene catalysts in the production of polyolefins in general, and of polyethylene in particular, is known in the art. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerisation of olefins has various advantages. Metallocene catalysts have high activities and are capable of preparing polymers with enhanced physical properties in comparison with the polymers prepared using Ziegler-Natta catalysts. Metallocene catalysts are usually employed with a co-catalyst such as an organometallic compound, or a mixture of non-coordinated Lewis acid and alkylaluminium as it is well known in the art. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and growing chain of polymer.

As used herein, the term "catalyst slurry" refers to a composition comprising catalyst solid particles that are in suspension. The term "concentrated catalyst slurry" refers to a composition comprising catalyst solid particles that are in suspension whereby the concentration of catalyst is at least higher than 10% by weight. The term "diluted catalyst slurry" refers to a composition comprising catalyst solid particles that are in suspension, whereby the concentration of catalyst is lower than or equal to 10% by weight. The diluent is typically a hydrocarbon diluent.

It is well known that the polymerisation reaction is quite sensitive to the quantity of catalyst utilized. It is important to control catalyst flow to a reactor since unexpected or uncontrolled catalyst injection in a reactor could lead to runaway reactions. Furthermore, metallocene catalysts are usually employed with a co-catalyst for olefin polymerisation, which can significantly enhance the polymerisation efficiencies to beyond a million units of polymer per unit of catalyst. A solution to problems due to these facts has been proposed in the patent application WO 2005/077522.

At the moment, the catalyst productivity is estimated by first measuring the amount of silica in the final PE powder by X-ray fluorescence (XRF). The productivity of the catalyst is then calculated as g PE/g catalyst that has entered the reactor. The problem with this current method is that metallocene catalysts have a high productivity with relatively low quantities of silica, making it difficult to measure the amount of silica in the final PE leading to important errors in the calculation and thus in the estimated productivity. The estimated productivity can also not be controlled in a rapid manner that is sometimes required for on-line control of the process.

It is therefore a general object of this invention to provide a method and system for measuring catalyst productivity in an accurate manner, especially in the case of metallocenes. It is a further object of the present invention to provide a method and system for measuring catalyst productivity on-line and/or without any significant delays. Furthermore, the present invention aims to provide an improvement to the system and method described in WO 2005/077522.

SUMMARY OF THE INVENTION

At least one of the above mentioned problems is solved and objects achiever at least partially with the present invention, namely a method for determining activity of a catalyst in a polymerisation process, said polymerisation process comprising the steps of feeding a catalyst and a diluent into a storage vessel, to form a concentrated settled catalyst, feeding said concentrated settled catalyst into a mixing vessel equipped with mixing means and feeding hydrocarbon diluent into said mixing vessel, to form a diluted catalyst slurry, feeding said diluted catalyst slurry into a polymerisation reactor via a volumetric pump, and feeding at least one monomer into said polymerisation reactor to form a polymer.

The method is characterised in that density of the diluted catalyst slurry is measured between an outlet of the mixing vessel and the volumetric pump, the amount of catalyst fed into the polymerisation reactor is determined based on the measured density of the diluted catalyst slurry, and the amount of catalyst fed into the polymerisation reactor is compared to the amount of the polymer formed to determine the activity of the catalyst.

The present invention also relates to a system for determining activity of a catalyst in a polymerisation process comprising at least one storage vessel provided with a catalyst inlet, a diluent inlet and an outlet for a concentrated catalyst slurry, means for transferring said concentrated catalyst slurry from the storage vessel to a mixing vessel, at least one mixing vessel equipped with mixing means, an inlet for the concentrated catalyst slurry, a diluent inlet and an outlet for diluted catalyst slurry, means for transferring the diluted catalyst slurry into a polymerisation reactor, said means being equipped with a volumetric pump, a polymerisation reactor comprising an inlet for the diluted catalyst slurry, an inlet for monomer and an outlet for the polymer, and means for measuring the amount of polymer formed.

The system is characterised in that it further comprises means for measuring density arranged between the outlet for diluted catalyst slurry of the mixing vessel and the volumetric pump, and means for comparing the amount of catalyst fed into the polymerisation reactor to the amount of the polymer formed to determine the activity of the catalyst.

DETAILED DESCRIPTION OF THE INVENTION

Figure 1:
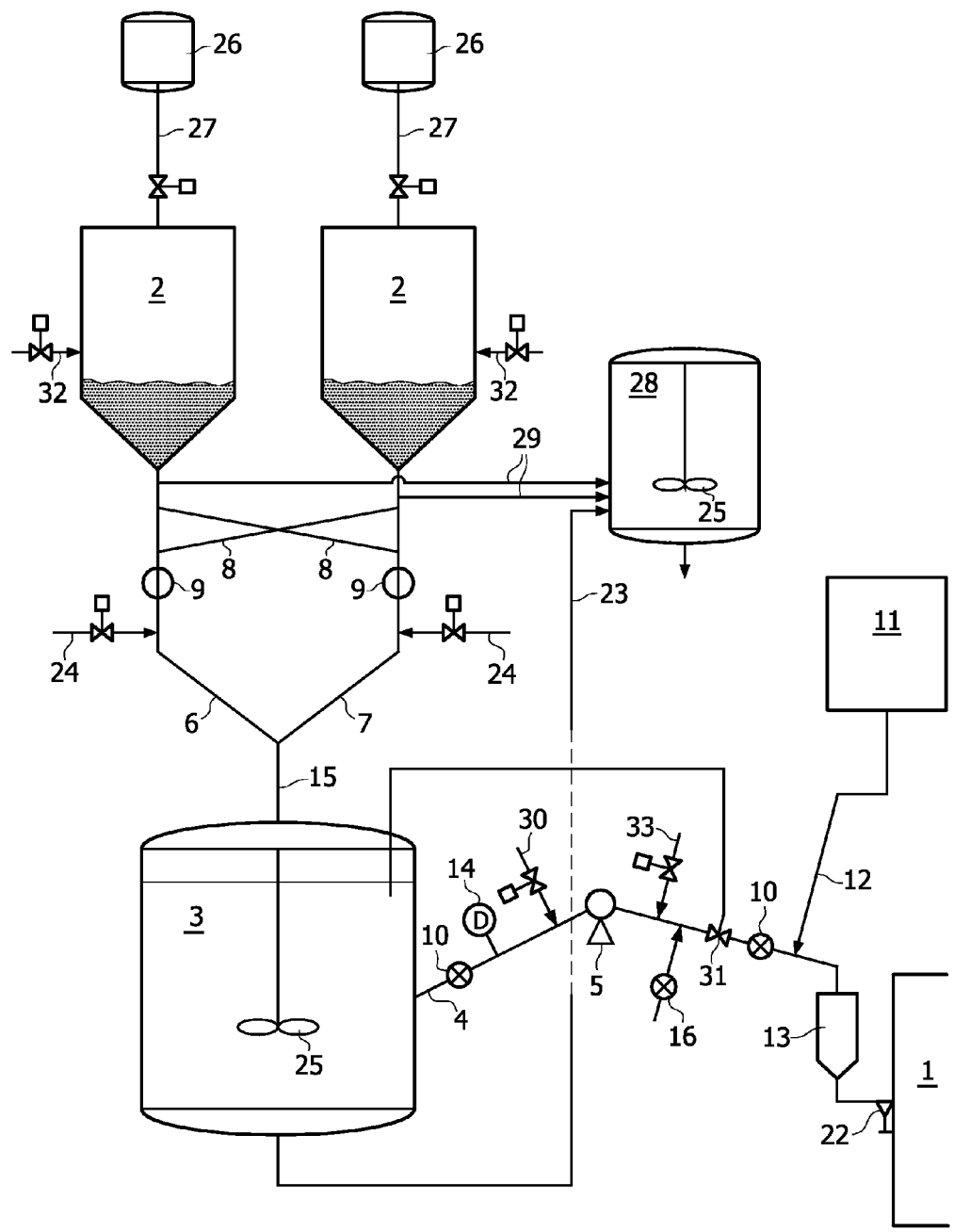
FIG. 1 illustrates a system according to a first embodiment of the present invention.

The present invention relates to a method for determining activity of a catalyst in a polymerisation process, said polymerisation process comprising the steps of
feeding a catalyst and a diluent into a storage vessel, to form a concentrated settled catalyst,
feeding said concentrated settled catalyst into a mixing vessel equipped with mixing means and feeding hydrocarbon diluent into said mixing vessel, to form a diluted catalyst slurry,
feeding said diluted catalyst slurry into a polymerisation reactor via a volumetric pump, and
feeding at least one monomer into said polymerisation reactor to form a polymer.

The method is characterised in that
density of the diluted catalyst slurry is measured between an outlet of the mixing vessel and the volumetric pump,
the amount of catalyst fed into the polymerisation reactor is determined based on the measured density of the diluted catalyst slurry, and
the amount of catalyst fed into the polymerisation reactor is compared to the amount of the polymer formed to determine the activity of the catalyst.

Thus in order to solve the problems of imprecision, the present invention proposes to use the production parameters in order to evaluate the productivity of the catalyst, on-line and with no delay. This also leads to a better control of the process. For example, it will be possible to see immediately if there has been a contamination of the catalyst, a change in the catalyst lot, if the dryers are not functioning well etc.

According to an embodiment of the invention, the feeding of said concentrated settled catalyst into a mixing vessel is made batch-wise.

According to an embodiment of the present invention, the amount of polymer formed is measured by comparing the flow of monomer fed into the polymerisation reactor and the flow of flushed, non-reacted monomer at the outlet of the polymerisation reactor. This measurement is known per se to persons skilled in the art.

According to another embodiment, the diluted catalyst slurry is further diluted downstream of the volumetric pump. The dilution is made by injecting a further amount of diluent into the diluted catalyst slurry, and preferable the flow of diluent added is measured and this measure is used to determine the amount of catalyst fed into the polymerisation reactor in an even more accurate way.

According to yet a further embodiment, the amount of catalyst fed into the polymerisation reactor is determined as the average of
the amount determined based on the measured density of the diluted catalyst slurry, and
at least one of the values selected from the group consisting of
the amount determined based on a flow-rate of diluent entering the mixing vessel and a concentration of the diluted catalyst slurry,
the amount determined based on flow-rate of the volumetric pump, and
the amount determined based on a flow of a hydrocarbon diluent used for further diluting the diluted catalyst slurry and a flow of the further diluted catalyst slurry.

The amount of catalyst fed into the mixing vessel can also be measured based on the amount of the batches fed into said mixing vessel per unit of time.

In the present invention, the quantity of catalyst entering the reactor is thus preferably evaluated based on the average of two to four measures and by comparing this average to the amount of resulting polymer product. The mean variation of the measures can also be followed in order to control the process.

Preferably the catalyst is a metallocene catalyst, due to the fact that the amounts of catalysts used in metallocene processes are so small that the imprecision in the measurement of the amount of silica in the final polymer leads to important errors in the calculation and thus in the estimated productivity. The present invention thus solves this problem and provides a method whereby even the productivity of small amounts of catalyst can be measured in an accurate way.

According to an embodiment, the monomer is selected from the group consisting of ethylene, propylene, 1-butene, 1-hexene, 1-octene, 1-decene and mixtures thereof.

The diluent used in the present method may be selected from the group consisting of hydrocarbon diluents and mineral oils, such as isobutene, hexane, pentane, heptane, octane or cyclohexane.

The invention can be used in the polymerisation of any desired monomer. It is however particularly preferred in a slurry loop polymerisation wherein ethylene is polymerised. Suitable "ethylene polymerisation" includes but is not limited to homo-polymerisation of ethylene, co-polymerisation of ethylene and a higher 1-olefin co-monomer such as butene, 1-pentene, 1-hexene, 1-octene or 1-decene. Ethylene polymerisation comprises feeding to a reactor the reactants including the monomer ethylene, a light hydrocarbon diluent, a catalyst and optionally, a co-monomer and hydrogen. In an embodiment of the present invention, said co-monomer is hexene and said diluent is isobutane.

The catalyst feeding method preferably used in the present invention has been described in WO 2005/077522, the contents of which are hereby incorporated by reference. This document mentions that measuring means can measure the density of the slurry but it does not mention that any such measure could be used for determining catalyst activity.

According to an embodiment of the present invention, the feeding of the catalyst is performed in the following manner. Firstly, the catalyst is fed in a non-stirred tank filled with isobutane at 9 bars. A batch of catalyst is fed to second tank by a catalyst feeder, each batch being called a dump. Based on the number of dumps/hour (the volume of one dump being known), it is possible to calculate the amount of catalyst entering said second tank, this being a first way of measuring the amount of catalyst. This measurement is already used for some processes with chromium catalysts.

The second tank is stirred so as to make a slurry of the catalyst in isobutane, isobutane being fed to said second tank at a pressure of 4 bars and the second tank being full liquid at all times. At the outlet of said second tank, a density-measuring device determines the density of the passing slurry. A second way of measuring the amount of catalyst is based on this density at the outlet of the second tank, by multiplying it with the flow of isobutane and the concentration of the catalyst.

After the density-measuring device, a volumetric pump is provided. A third way of measuring the amount of catalyst is to multiply the frequency of the pump by the density measured just before it and empiric factor specific to the pump, in order to arrive at the amount of catalyst. This way is presently used for some Ziegler-Natta catalyst processes.

After said pump, a further constant feed of isobutane, at 50 l/hour is added to the slurry, the flow of the feed being measured by a first flow meter, typically before mixing it with the diluted catalyst slurry. The resulting further diluted catalyst slurry passes through a second flow meter, and the final quantity of slurry entering the reactor is the difference between the measures of the second and first flow meters. By multiplying this with the density and the concentration of the catalyst, a fourth measure of the quantity of catalyst used can be estimated.

At the end, an average value of these four measures is calculated, giving the average catalyst flow rate. Preferably, the measurement means are linked to a computer, in any known manner such as by cables or radio transmission, which computer is provided with a suitable program for following the values emitted by the measurement means, for calculating the average values and mean variations. Preferably, the program is also provided with suitable threshold values so as to alert the process controller of a possible anomaly in the values.

An advantage of using all the four values is the increased reliability of the measure, as it will give accurate enough results even if one of the measuring systems is out of order. As mentioned above, the mean variation of the measures can also be followed in order to control the process, i.e. a problem can also be detected due to a change in one of the measurement systems.

In a particularly preferred embodiment, the invention relates to a method for determining activity of a catalyst in a polymerisation process wherein bimodal polyethylene (PE) is prepared. "Bimodal PE" refers to PE that is manufactured using two reactors, which are connected to each other in series. However, the present method should be understood to be applicable to processes wherein other types of polymerisation reactions take place as well.

The present invention also relates to a system for determining activity of a catalyst in a polymerisation process comprising
  at least one storage vessel provided with a catalyst inlet, a diluent inlet and an outlet for a concentrated catalyst slurry,
  means for transferring said concentrated catalyst slurry from the storage vessel to a mixing vessel,
  at least one mixing vessel equipped with mixing means, an inlet for the concentrated catalyst slurry, a diluent inlet and an outlet for diluted catalyst slurry,
  means for transferring the diluted catalyst slurry into a polymerisation reactor, said means being equipped with a volumetric pump,
  a polymerisation reactor comprising an inlet for the diluted catalyst slurry, an inlet for monomer and an outlet for the polymer, and
  means for measuring the amount of polymer formed.
The system is characterised in that it further comprises
  means for measuring density arranged between the outlet for diluted catalyst slurry of the mixing vessel and the volumetric pump, and
  means for comparing the amount of catalyst fed into the polymerisation reactor to the amount of the polymer formed to determine the activity of the catalyst.

The system according to the present invention is thus suitable for carrying out the method according to the invention and for achieving at least partially at least one of the objects mentioned above.

The volumetric pump flow rates can be controlled by the reactor activity. The volumetric pump is in particular controllable in function of the concentration of a reactant in said reactor. Preferably said reactant is the concentration of monomer, i.e. ethylene, in the reactor. However, it should be clear that the volumetric pumps, preferably membrane pumps, are also controllable in function of the concentration of other reactants, such as e.g. the co-monomer or hydrogen concentrations in the reactor as well. According to an embodiment of the invention, the system also comprises means for further diluting the diluted catalyst slurry downstream of the volumetric pump.

According to another embodiment, the system further comprises at least one device selected from the group consisting of
  means for measuring the flow of diluent entering the mixing vessel,
  means for measuring the concentration of the diluted catalyst slurry at the outlet for diluted catalyst slurry of the mixing vessel, means for measuring the flow-rate of the volumetric pump,
means for measuring the flow of a hydrocarbon diluent used for further diluting the diluted catalyst slurry, and
means for measuring a flow of the further diluted catalyst slurry.

The measures obtained from these means, which are all connected to the means for comparing the amount of catalyst fed into the polymerisation reactor to the amount of the polymer formed to determine the activity of the catalyst, are used to further determine the amount of catalyst fed into the polymerisation reactor. Therefore the means for comparing are preferably able to determine the average values of these measures.

According to a preferred embodiment of the invention, the polymerisation reactor comprises at least two loop reactors connected in series, as discussed in more detail above.

In a further embodiment, the present system is also provided with a co-catalyst distribution system (herein also referred to as to a co-catalyst feeding system), for bringing a suitable amount of co-catalyst into contact with the catalyst slurry for a suitable period of time before supplying said catalyst slurry to said reactor. This co-catalyst distribution system is also described in more detail in WO 2005/077522.

In a further preferred embodiment, said conduits for transferring said catalyst slurry from a storage vessel to a mixing vessel are each provided with a metering valve, provided downstream the connecting lines. This embodiment is explained in more detail below.

The details and embodiments given above in connection with the method also apply to the system according to the present invention and vice versa.

The present invention furthermore relates to a method for controlling a polymerisation process, i.e. the present method can also be used for controlling a polymerisation process.

The invention further relates to a use of an apparatus according to WO 2005/077522 equipped with means for measuring density arranged between an outlet for diluted catalyst slurry of the mixing vessel and a membrane pump, and means for comparing the amount of catalyst fed into the polymerisation reactor to the amount of the polymer formed, to determine the activity of the catalyst.

The invention thus relates to a use of an apparatus for preparing and supplying catalyst slurry to a polymerisation reactor wherein polyethylene is prepared, comprising one or more storage vessels for containing concentrated catalyst slurry consisting of solid catalyst particles suspended in a hydrocarbon diluent or in a mineral oil, a mixing vessel for containing diluted catalyst slurry of a suitable concentration for use in a polymerisation reaction, being connected with said storage vessels by one or more conduits for transferring said catalyst slurry from said storage vessels to said mixing vessel, and being provided with one or more conduits for transferring the diluted catalyst slurry from said mixing vessel to said reactor, and one or more conduits, connecting said mixing vessel to a polymerisation reactor for transferring said diluted catalyst slurry from said mixing vessel to said reactor, whereby each conduit is provided with a membrane pump for pumping said slurry to said reactor, which is controllable in function of the concentration of a reactant in said reactor, said apparatus being equipped with means for measuring density arranged between an outlet for diluted catalyst slurry of the mixing vessel and a membrane pump, and means for comparing the amount of catalyst fed into the polymerisation reactor to the amount of the polymer formed, to determine the activity of the catalyst.

The details and embodiments given above in connection with the method and system also apply to the method and use as disclosed above, and vice versa.

The invention is described in more detail in the following description of the drawing. This description is only intended to give some examples of the invention and is not to be construed as limiting the scope of the invention. Moreover, the reference marks in the claims are merely indicatives and are not to be construed as limiting the scope of protection.

DETAILED DESCRIPTION OF THE DRAWING

FIG. 1 illustrates a system according to a first embodiment of the present invention. The system comprises one or more catalyst storage vessels, or so-called mud tank or pot 2 which contain solid-liquid slurry of metallocene catalyst and isobutane diluent. The slurry is fed from the mud pot 2 through the combination of conduit 6, 7 and conduit 15 to a mixing vessel 3, wherein the slurry is diluted to a suitable concentration. In addition, the system further comprises one or more conduits 4, which connect the mixing vessel 3 to a polymerisation reactor 1 and through which the diluted catalyst slurry is pumped from said mixing vessel 3 to the reactor 1, by means of a volumetric pump 5 provided in this conduit 4.

The metallocene catalysts can be provided under a dry form in commercially available drums or tote bins 26. Using appropriate systems, the catalyst is preferably transferred from such drums to a storage vessel 2. According to a preferred embodiment, the metallocene catalyst is provided from drums 26 to a storage vessel 2 through a conduit 27. In an alternative embodiment, the metallocene catalyst can also be provided in a commercial container that is suitable for use as a storage vessel 2. Isobutane diluent is brought into the storage vessel 2 by means of a conduit 32 equipped with a control valve.

In a particularly preferred embodiment, the conduits 6, 7 are interconnected by means of connecting lines 8. Such lines 8 enable that the different storage vessels 2 can be used in accordance with all provided conduits 6, 7.

Each conduit 6, 7 is preferably equipped with metering valves 9 allowing the feeding of a controlled flow rate of catalyst to the mixing vessel 3. These valves are preferably provided downstream the connecting lines 8. The pressure difference between the storage vessel 2 and the mixing vessel 3 supplies the motive force to feed the catalyst to the mixing vessel.

The metering valves 9 allow the transfer of a predetermined volume, i.e. a batch, of catalyst to the mixing vessel 3. The catalyst slurry discharged by the valves is carried to the mixing vessel by a flow of diluent. Therefore, the conduits 6, 7 each are preferably further provided with a port 24, which can be connected for flushing with diluent. Said port is preferably provided downstream the valves 9.

In a preferred embodiment, the metering valves 9 are ball check feeder or shot feeder valves. The cycle time of the valves determines the catalyst flow rate to the mixing vessel 3. For instance, when this cycle time is increased, the flow rate of catalyst decreases.

Due to the high degree of dilution and the use of membrane pumps the catalyst feeding system from the storage vessel 2 to the mixing vessel 3 advantageously allows providing catalyst at a controlled flow rate to the mixing vessel 3. In addition, the feeding system permits to keep the concentration of catalyst slurry in the mixing vessel 3 at a substantially constant level, since catalyst flow regulated by the valve 9 to the mixing vessel 3 is dependent on the dosed amount (concentration) of catalyst and diluent in the mixing vessel 3. In a preferred embodiment of the invention the concentration of catalyst slurry in the mixing vessel is kept at a substantially constant level.

Catalyst wastes can be sent to one or more dump vessels 28, which are preferably provided with stirring means 25 and contain mineral oil for neutralization and elimination of the wastes. The dump vessels are preferably connected by means of conduits 29 to the catalyst feeding conduits 6 or 7. The dump vessel 28 is preferably also connected to the mixing vessel 3, for transferring catalyst wastes by means of a conduit 23. The catalyst waste remaining after evaporation of the diluent is removed from the vessels 28, preferably by means of a draining system, provided at the bottom of the vessel 28.

The mixing vessel 3 can be operated either when full of liquid or not. Preferably, the mixing vessel 3 is operated full of liquid, since if there is an interphase with nitrogen the catalyst slurry might settle or stick to the walls in the vessel.

Preferably, the metallocene catalyst slurry is diluted in a hydrocarbon diluent in the mixing vessel 3 to a concentration between 0.1% and 10% by weight. More preferably the slurry is diluted in a hydrocarbon diluent to a concentration comprised between 0.1% and 4% by weight, more preferred between 0.1 and 1%, and even more preferred of 0.5% by weight. Preparing diluted slurry having these concentrations advantageously enables the further use of membrane pumps 5 for injecting the slurry in the reactor 1, as described into more detail below. The mixing vessel 3 is also provided with a stirrer 25 for maintaining the homogeneity of the slurry.

Dilute catalyst slurry is withdrawn from the mixing vessel 3 through one or more conduits 4 and provided through these conduits to a polymerisation reactor 1. Each conduit 4 is provided with a pumping means 5, which controls the transfer and injection of the metallocene catalyst slurry into the reactor 1. In a particularly preferred embodiment, said pumping means are membrane pumps. The conduits 4 preferably leave the mixing vessel 3 in upward direction under an angle preferably superior to 10°, and more preferably superior to 30°. In addition, the conduit provided downwards the pumping means 5 conducts the catalyst slurry preferably downwardly, under an angle preferably superior to 10°. Such configuration improves the action of the pumping means 5 and also enables to avoid plugging in the pumping means 5 since under this configuration the slurry tends to settle away from the pumps 5 in case the pumps 5 are interrupted or stopped. However, it is to be understood that conducts, which extend downwardly are not required if sufficient flushing of the conduit 4 can be obtained.

The conduit 4 is equipped with means 14 for measuring the density of the diluted catalyst slurry, preferably between the mixing vessel 3 and the pump 5. The conduit 4 is also equipped with a connection for diluent wherein a flow measuring means 16 is arranged. This connection is used to inject diluent into the stream of diluted catalyst slurry to further dilute it.

The conduits 4 are further provided with isobutane flushing means, either at the inlet 30, at the outlet 33 or at both sides of the membrane pumps 5, as illustrated on FIG. 1. Isobutane flushing means 30, 33 enable to flush isobutane through the conduit 4 and to keep the conduits 4 and the pumping means 5 unplugged. In addition, two-way valves 31 can be installed on the conduits 4, in order to never stop the pumping means 5.

In a further embodiment, the system according to the present invention is further provided with a co-catalyst distribution system, for bringing a suitable amount of co-catalyst into contact with the catalyst slurry for a suitable period of time before supplying said catalyst slurry to said reactor. When using a metallocene catalyst, tri isobutyl aluminium (TIBAL) is preferably used as co-catalyst.

Referring to FIG. 1, the co-catalyst distribution system 11 may comprise two co-catalyst storage vessels wherein co-catalyst is prepared and stored. One vessel may be in connection to the conduit 4 via a feeding conduit 12 for providing co-catalyst thereto. Co-catalyst wastes can also be sent to a dump vessel. In case a flow measuring means 10 is further provided on the conduits 4, the co-catalyst feeding conduit 12 preferably intersects the conduit 4, downstream of said flow meter 10 and upstream the reactor 1.

Each conduit 4 is also provided with a contact vessel 13, preferably downstream the injection point of the co-catalyst distribution system, for enhancing the contact time of said co-catalyst with said catalyst slurry in the conduits 4.

In addition, in various embodiments of a system according to the invention conduits 4 are provided which are further provided with measuring means 10, for easily measuring the catalyst flow rate in the conduits 4. These flow measuring means 10 preferably are Coriolis flow measuring means. The means 10 can be provided between the mixing vessel 3 and the membrane pumps 5 or downstream from said pumping means 5. Preferably, said means 10 are provided upstream of the co-catalyst injection conduit 11.

In another embodiment, the catalyst slurry is injected under controlled flow rate into the reactor. The conduits 4 for transferring catalyst slurry into to the reactor are equipped by one or more valves, preferably piston valves 22. The piston valves 22 are capable of sealing the orifice by which the conduit 4 is connected to the reactor 1.

The means for comparing the amount of catalyst fed into the polymerisation reactor to the amount of the polymer formed to determine the activity of the catalyst, as well as the means for connecting the different measuring means to said means for comparing are not shown in FIG. 1, for sake of clarity.

For reasons of brevity and clarity, conventional auxiliary equipment such as pumps, additional valves, and other process equipment have not been included in this description and the accompanying drawing, as they play no part in the explanation of the invention. Also additional measurement and control devices which would typically be used on a polymerisation process have not been illustrated.

It is clear from the present description that numbers and dimensions of the different parts of the system according to the present invention relate to the size of the polymerisation reactors and can be changed in function of the reactor sizes.

In another preferred embodiment, by operation in accordance with the present invention, all lines, vessels, pumps, valves, etc. can be kept free of clogging by means of flushing or purging with nitrogen or diluent, i.e. isobutane. It is to be understood that where necessary flushing and purging means and lines are available on the device according to the invention in order to avoid plugging, or blocking.

In another preferred embodiment, it is to be understood that all lines or conduits applied in accordance with the present invention may be provided, where necessary with flow measuring means.

The invention claimed is:

1. A method for determining activity of a catalyst in a polymerisation process, said polymerisation process comprising the steps of feeding a catalyst and a diluent into a storage vessel, to form a concentrated settled catalyst, feeding said concentrated settled catalyst into a mixing vessel equipped with mixing means and feeding hydrocarbon diluent into said mixing vessel, to form a diluted catalyst slurry,
feeding said diluted catalyst slurry into a polymerisation reactor via a volumetric pump, and
feeding at least one monomer into said polymerisation reactor to form a polymer,
wherein said catalyst activity is determined by
  measuring the density of the diluted catalyst slurry between an outlet of the mixing vessel and the volumetric pump,
  determining the amount of catalyst fed into the polymerisation reactor based on the measured density of the diluted catalyst slurry, and
  comparing the amount of catalyst fed into the polymerisation reactor to the amount of the polymer formed to determine the activity of the catalyst and wherein the amount of catalyst fed into the polymerisation reactor is determined as the average of
the amount determined based on the measured density of the diluted catalyst slurry, and
at least one of the values selected from the group consisting of
  the amount determined based on a flow-rate of diluent entering the mixing vessel and a concentration of the diluted catalyst slurry,
  the amount determined based on flow-rate of the volumetric pump, and
  the amount determined based on a flow of a hydrocarbon diluent used for further diluting the diluted catalyst slurry and a flow of the further diluted catalyst slurry.

2. The method of claim 1, wherein the amount of polymer formed is measured by comparing the flow of monomer fed into the polymerisation reactor and the flow of flushed, non-reacted monomer at the outlet of the polymerisation reactor.

3. The method of claim 1 wherein the diluted catalyst slurry is further diluted downstream of the volumetric pump.

4. The method of claim 1 wherein the amount of catalyst fed into the mixing vessel is measured based on the amount of the batches fed into said mixing vessel per unit of time.

5. The method of claim 1 wherein the catalyst is a metallocene catalyst.

6. The method of claim 1 wherein the monomer is selected from the group consisting of ethylene, propylene, 1-butene, 1-hexene, 1-octene, 1-decene and mixtures thereof.

7. The method of claim 1 wherein the diluent is selected from the group consisting of hydrocarbon diluents and mineral oils.

8. The method of claim 1 wherein the feeding of the concentrated settled catalyst into a mixing vessel is made batchwise.

* * * * *